United States Patent [19]
Latvis, Jr. et al.

[11] Patent Number: 6,098,966
[45] Date of Patent: Aug. 8, 2000

[54] APPARATUS FOR ABSORBING SHOCK AND ATTENUATING VIBRATIONS

[75] Inventors: Michael Paul Latvis, Jr., Orchard Park; Daniel Charles Radice, Eden; Gerald John Spyche, Jr., South Wales, all of N.Y.

[73] Assignee: Enidine Incorporated, Orchard Park, N.Y.

[21] Appl. No.: 09/294,183

[22] Filed: Apr. 19, 1999

[51] Int. Cl.⁷ .................................................. B60G 11/26
[52] U.S. Cl. ............................................. 267/34; 267/221
[58] Field of Search .............................. 267/34, 186, 190, 267/221, 286, 136; 188/315

[56] References Cited

U.S. PATENT DOCUMENTS

| | | | |
|---|---|---|---|
| 1,842,273 | 1/1932 | Lancia | 267/221 |
| 2,905,458 | 9/1959 | Mason | 267/34 |
| 3,794,309 | 2/1974 | Chrokey et al. | 267/34 |
| 4,709,791 | 12/1987 | Houghton . | |
| 4,752,062 | 6/1988 | Domenichini | 267/186 |
| 4,822,012 | 4/1989 | Sketo | 267/34 |

*Primary Examiner*—Chris Schwartz
*Attorney, Agent, or Firm*—Wall Marjama Bilinski & Burr

[57] ABSTRACT

Apparatus for both attenuating vibrations below a given load and absorbing shock above the given load. A hydraulic damper unit is equipped with a spring that preloads the device and positions the damper in a neutral or centered position. The spring holds the damper unit centered until the preload force is exceeded in either tension or compression. Elastomeric rod ends connect the damper unit to a mass to be protected and a supporting structure. The elastomeric rod ends have a response such that they attenuate vibrations up to the preloading force of the spring whereupon the elastomer is fully compressed thus permitting the damper to be displaced to absorb shock loads that are greater than the preload break-away force.

8 Claims, 3 Drawing Sheets

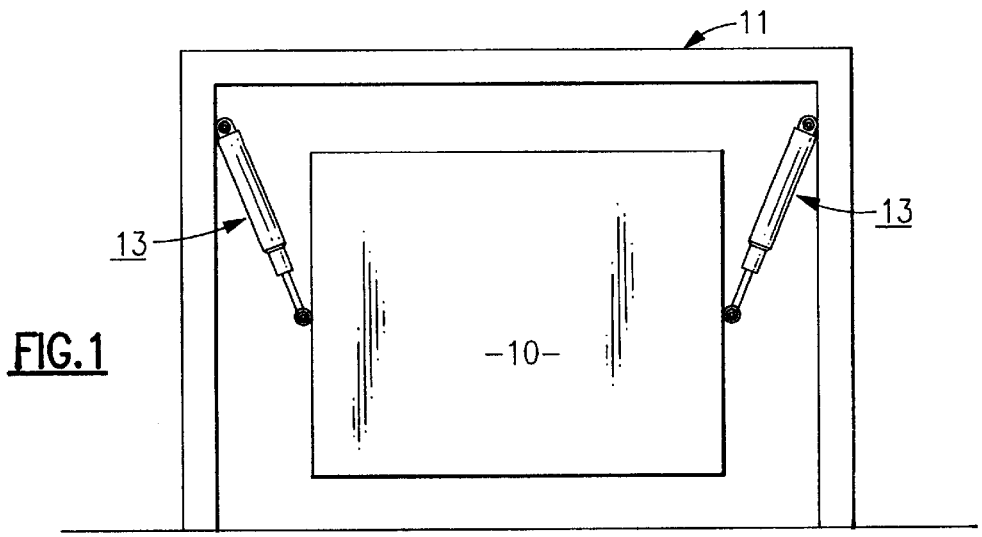
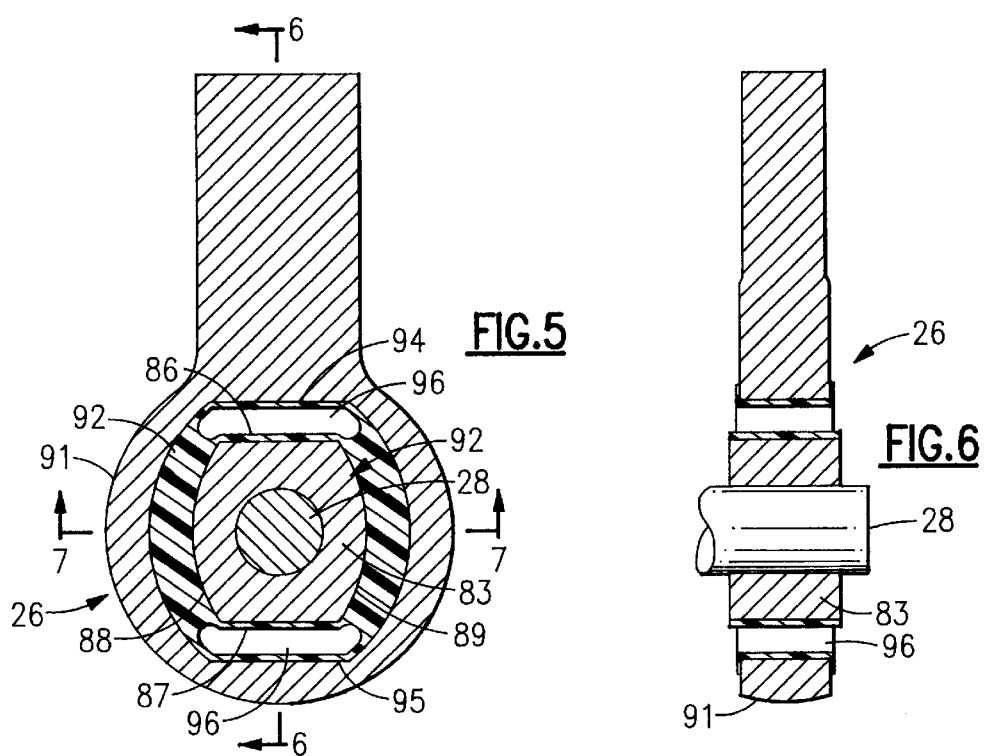
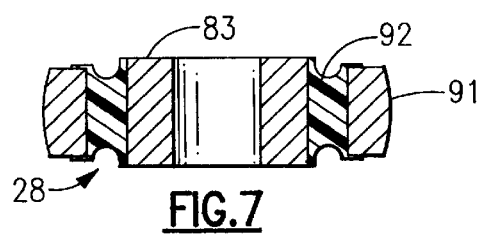

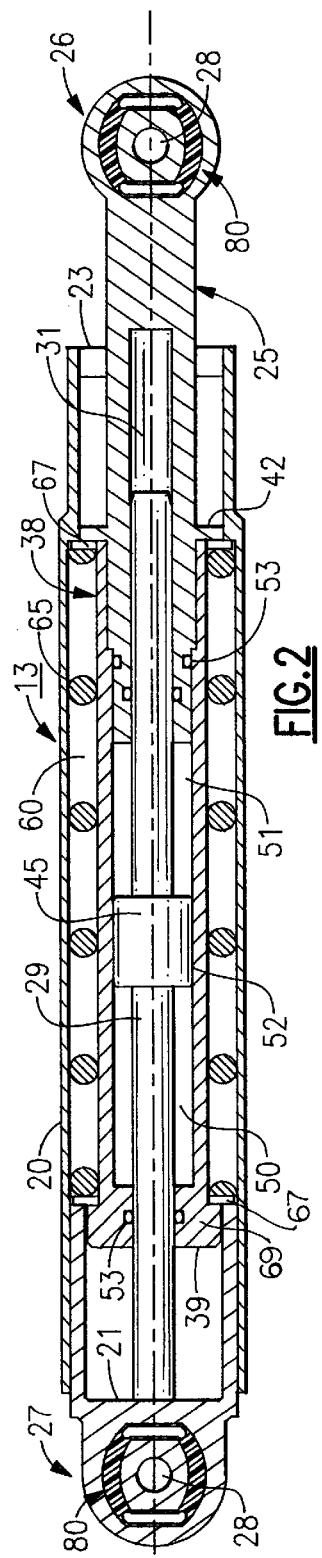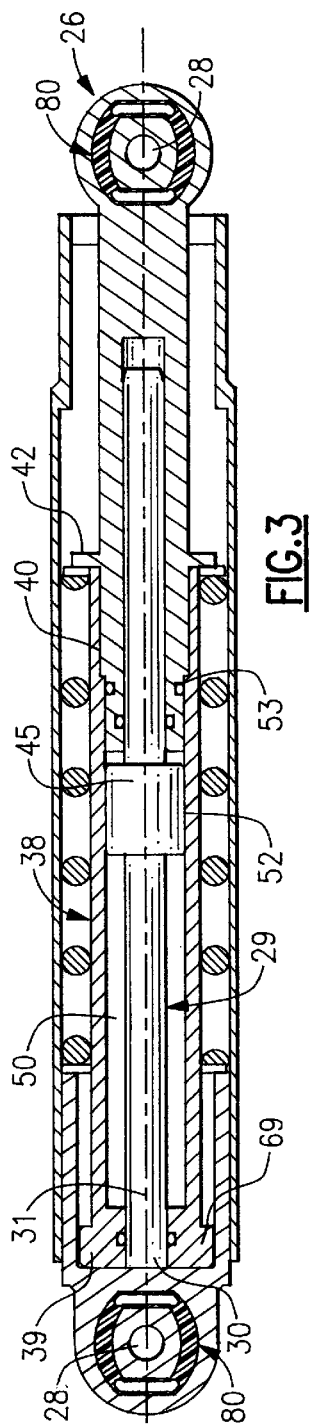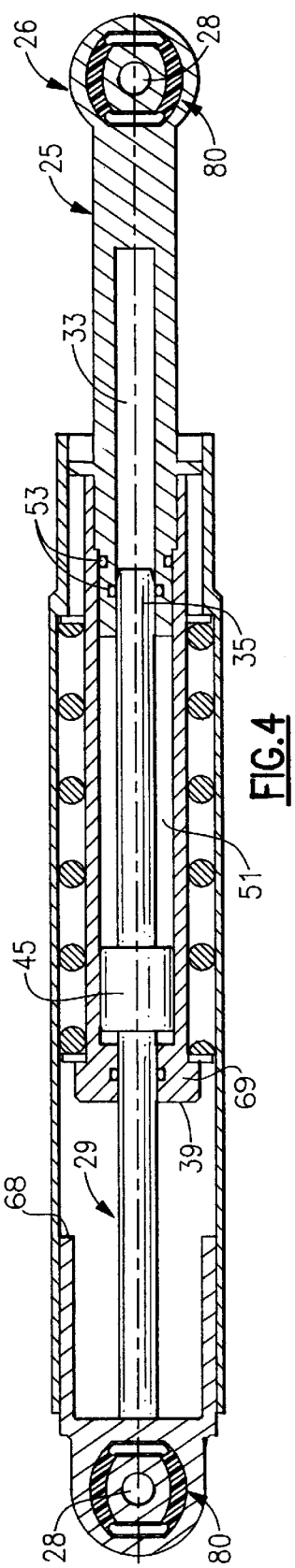

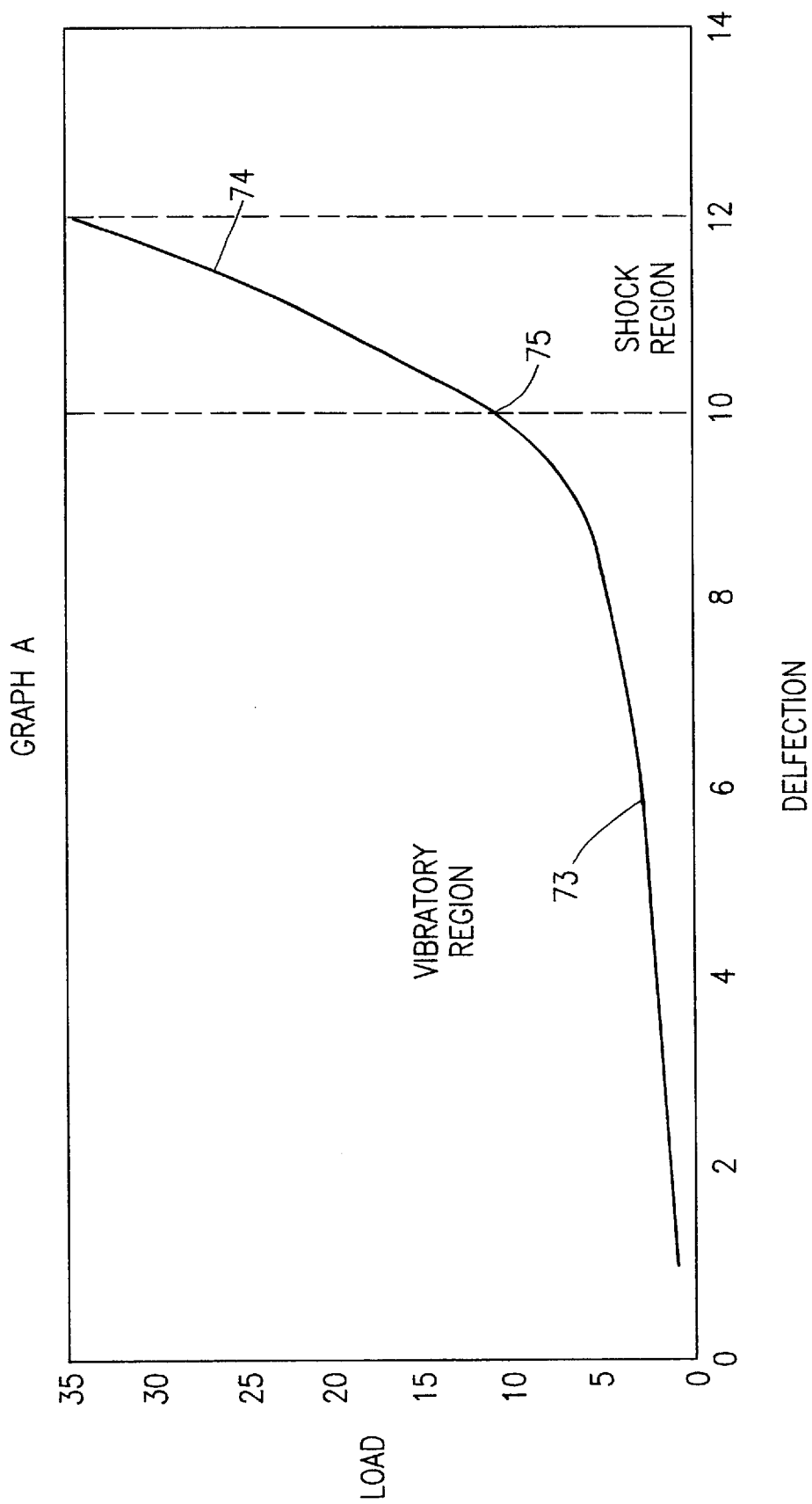

APPARATUS FOR ABSORBING SHOCK AND ATTENUATING VIBRATIONS

BACKGROUND OF THE INVENTION

This invention relates to apparatus for providing static support for a mass with both shock attenuation and vibration isolation and, in particular, to a highly reliable apparatus for protecting relatively sensitive equipment from the harmful effects of both vibrations and shock.

Many relatively delicate instruments such as computers and the like that are installed onboard ships, rockets, aircrafts and many other applications, are exposed to both vibratory forces and shock loads, either of which can have an adverse effect upon the operation of the instrument. In an effort to protect the instrument, two separate systems are oftentimes provided which include a first system to attenuate vibrations and a second independent system to absorb shock. The two systems are generally relatively complex and, more importantly, space consuming. In many applications when little space is available, a large penalty is paid to house the equipment to independently attenuate vibrations and absorb the effects of high shock loads.

SUMMARY OF THE INVENTION

It is therefore an object of the present invention to improve apparatus for protecting equipment from both high shock loads and vibratory forces.

It is a further object of the present invention to reduce the amount of space required to protect equipment from the potentially harmful effects of both vibratory forces and shock loads.

Another object of the present invention is to provide a single component that will both absorb high shock loads and attenuate vibrations.

A still further object of the present invention is to provide a compact unit that will attenuate vibrations below a given break-away load and automatically absorb shock when the break-away load is exceeded.

These and other objects of the present invention are attained by a hydraulic damper containing a double acting spring that provides a given static preload and centering force to the damper so that it will not respond to forces below the spring preload force. The damper further includes a piston rod that can be either extended or compressed when experiencing a shock load that exceeds the break-away preload of the spring. The shock absorber has opposed rod ends that include elastomeric elements which are connected to the mass being protected and the structure that supports the mass. The elastomeric rod ends are designed to attenuate vibrations up to the break-away preload on the damper after which the rod ends become fully compressed thus providing a direct connection between the support structure and the mass through the shock absorber after which the damper automatically takes over to absorb the shock forces.

BRIEF DESCRIPTION OF THE DRAWING

For a better understanding of these and other objects of the invention, reference will be made to the following detailed description of the invention which is to be read in association with the accompanying drawing, wherein:

FIG. 1 is a schematic representation showing a mass being supported by apparatus embodying the teachings of the present invention.

FIG. 2 is an enlarged side elevation in section showing the combination shock absorber and vibration isolator of the present invention in a neutral or centered position;

FIG. 3 is a view similar to FIG. 2 illustrating the piston rod of the apparatus shown in FIG. 1 in a compressed condition;

FIG. 4 is also a view similar to FIG. 2 illustrating the piston rod of the apparatus of the present invention in an extended condition;

FIG. 5 is an enlarged side view in section illustrating one of the rod end assemblies utilized in the present invention for isolating vibrations;

FIG. 6 is a sectional view taken along lines 6—6 in FIG. 5;

FIG. 7 is a sectional view taken along lines 7—7 in FIG. 5; and

FIG. 8 is a load/deflection curve showing the response of the present apparatus when compressed slowly from its centered position.

DETAILED DESCRIPTION OF THE INVENTION

Referring initially to FIG. 1, there is shown in schematic outline of a typical application of the present invention. A mass 10 to be protected from the potentially harmful effects of both vibrations and high shock forces is hung from a support structure 11 by a pair of combination vibration isolators and shock absorbing damper units 13—13 embodying the teachings of the present invention. The mass, in practice, may be any sensitive instrument or piece of equipment, such as a computer, that can be adversely effected by vibrations or high intensity shock waves. The supporting structure may be a special housing or simply the superstructure of the vehicle or enclosure in which the mass is contained.

Turning now to FIGS. 2–4, there is shown a hydraulic damper unit generally designated 13. The unit includes an outer cylinder 20 that is closed at one end 21 by a rod end unit 22 and at the opposite end by an end wall 23. A piston rod 25 which, as will be explained in greater detail below, is slidably contained within the cylinder and protrudes outwardly from the cylinder end wall 23 and terminates in a second rod end 26. As will be explained in detail below, the rod ends are connected to the mass and the supporting structure by means of pinions 28–28.

A shaft 29 is anchored at its proximal end 30 in the closed end of the cylinder and extends along the axis 31 of the cylinder toward the open end thereof. The piston rod contains an elongated hole 33 (FIG. 4) therein which slidably receives the distal end 35 of the shaft. A shock tube 38 is mounted inside the cylinder in coaxial alignment with the shaft 30. End wall 39 of the tube rides in sliding relationship along the proximal end of the shaft and the opposite end 40 of the tube passes over the piston rod and is secured thereto in abutting contact against a raised shoulder 42. The shock tube, in assembly, is secured to the piston rod so that it will move in unison with the piston rod along the shaft.

A piston 45 is integral with or secured to the shaft 30 inside the shock tube. The piston divides the interior of the shock tube into a first fluid chamber 50 and a second fluid chamber 51 both of which are filled with a hydraulic fluid such as silicone or the like. The fluid can be orificed around the piston through a space 52 so that the fluid is exchanged between the chamber when the shock tube is repositioned along the shaft by movement of the piston rod. It should be clear to one skilled in the art that fluid can be meted through one or more orifices formed in the piston head. Suitable seals 53 are provided to prevent fluid from escaping from the chambers.

A recess 60 is formed in the inner wall of the cylinder 20 that contains a coil spring 65. One end of the recess contains a shoulder 42 while the other end contains a similar recess 68 that is formed by the end wall of the rod end 27 that extends some distance into cylinder 20. The spring is wound about the shock tube and is held in a preloaded condition between the recesses when the damper unit is in a neutral position, as illustrated in FIG. 2. In assembly, the ends of the spring rest against oversized retaining rings 67 that are interposed between the shoulders of the recess and spring ends. The rings extend radially out of the recess and can be contacted by shoulder 42 on the piston rod or a flange 69 at the distal end of the shock tube.

When the piston rod is moved into the hydraulic cylinder, as illustrated in FIG. 3, the shoulder 42 on the piston rod engages the right hand retaining ring and further compresses the preloaded spring. At the same time, fluid contained in chamber 51 is meted past the piston into chamber 50 which has been expanded due to the movement of the shock tube. As should be evident, the force acting on the unit must be greater than the compressive preloading on the spring in order for the piston to move in either direction. The energy of a compressive input as depicted in FIG. 3 will be dissipated by the hydraulic orificing of fluid about the piston and the further compression of the spring. Immediately following the compression cycle, the energy stored in the spring will return the unit to the neutral position shown in FIG. 2 under controlled conditions. The return of the shock tube, and thus the piston rod connected thereto, is controlled by the hydraulic orificing of the fluid around the piston.

FIG. 4 illustrates the hydraulic damper with the piston rod moved from the neutral position to an extended position. Here again, the preloaded spring is further compressed as the piston rod is moved under load away from the outer cylinder 20. In this mode of operation, chamber 50 is foreshortened while chamber 51 is expanded and fluid in chamber 50 is orificed around the piston into chamber 51. Upon release of the load, the spring serves to return the unit to the neutral position illustrated in FIG. 2. Rebounding is again controlled by the effect of hydraulic orificing.

As should be evident from the disclosure above, the response of the damper to shock loading is the same whether the damper is loaded in either compression or in tension.

As illustrated in FIGS. 2–4, each of the rod ends 26 and 27 are arranged so that they can be secured to the mass and its support structure by pinions 28. When the damper unit experiences a shock load greater than the spring preload or break-away force, the piston rod will move toward either the compressed or extended position, depending upon the direction of the force acting on the damper. However, prior to the load forces reaching the break-away condition, the unit can experience potentially harmful vibrations which, if not attenuated, are capable of being passed from the support structure directly through the damper units to the mass. The damper units can thus function as a direct link through which vibration forces below the preload break-away force are transmitted directly to the mass.

Each rod end is equipped with an elastomeric vibration isolator generally referenced 80 that is adapted to attenuate vibrations up to the break-away preload provided by the spring 65. Once the break-away point is reached, the isolators are fully compressed or stiffened to a point such that any further loading will cause the damper to react to absorb additional energy associated with higher loads. As can be seen, the isolators are specifically tuned to the damper so that one takes over where the other leaves off. The response characteristics of a typical elastomeric isolator in the vibratory region is illustrated by curve 73 in FIG. 8. Similarly, the response of the damper in the shock region is illustrated by 74 in FIG. 8. As can be seen, the isolators are designed to be compressed or stiffened along curve 73 to a point where the spring rate of the isolators increases rapidly. This occurs at 75 where the preload acting on the system is exceeded and the damper begins to absorb the energy within the shock region along curve 74.

Although the present invention has been described with reference to a shock absorber having opposed rod ends each having an isolator mounted therein, it should be obvious to one skilled in the art that other combinations can be utilized without departing from the teachings of the present invention.

FIGS. 5–7 illustrate a further embodiment of an isolator suitable for use in the present invention. An isolator is contained within one of the metal rod ends 26 and 27. A metal collar 83 is press-fitted or otherwise secured to pinions that connect the rod ends to either the mass or its supporting structure. The collar contains flat top and bottom surfaces 86 and 87, respectively, and opposed arcuate shaped side walls 88 and 89. An opening 96 is contained in the bell section 91 of the rod end that compliments the shape of the collar. An open space is provided between the collar and the opening in the bell. The area within the opening between the arcuate shaped wall surfaces is filled with an elastomer 92. The elastomer is adapted to produce a linear or non-linear response to vibrations below the break-away preload of the damper. The opening in the bell contains flat top and bottom wall surfaces 94 and 95 respectively that are separated from the collar wall surfaces 86 and 87 by an air gap 96. The opposing flat walls on the collar and bell are arranged to come into contact when the break-away force is reached thus providing a wide contact area that effectively transmits shock forces to the damper. One set of opposing surfaces will move into contact when the piston rod of the damper is extended and a second set will move into contact when the piston rod is compressed.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. Apparatus for isolating vibrations and mitigating the effects of shock upon a mass that includes:

a hydraulic shock absorber having a cylinder that is closed at one end and having a piston rod slidably contained in the other end, said piston rod being coaxially aligned along the axis of the cylinder and extended outwardly from the other end of said cylinder, an elongated shaft stationarily mounted at one end in the closed end of said cylinder said shaft being coaxially aligned with the axis of the cylinder and the opposite end of the shaft being slidably received in said piston rod, a shock tube surrounding said shaft, said shock tube having a proximal end slidably mounted on said shaft and a distal end secured to said piston rod for movement therewith, a compression spring mounted inside said cylinder in a preloaded neutral condition between the piston rod and the shock tube, said spring being further loaded as the piston rod moves into or out of said cylinder, a piston stationarily mounted on said shaft for dividing the shock tube into a first chamber on one side of the piston and a second chamber on the other side of the piston and orificing means for metering fluid contained in said chambers around said piston, as said piston rod moves into and out of said cylinder, a first connector means mounted upon the closed end of said cylinder and a second connector mounted upon the extended end of the piston rod so that one connector can be secured to a mass and the other to a mass supporting structure, and a vibration isolator associated with at least one of said connectors for attenuating vibrations acting on the mass, said at least one isolator being arranged to respond to vibratory loads up to the spring preload and thereafter change its spring rate wherein higher loads are absorbed by said shock absorber.

2. The apparatus of claim 1 wherein said spring is a coil spring that is wound about the shock tube and said spring being further contained within a recess formed in an inner wall surface of said cylinder.

3. The apparatus of claim 1 wherein fluid is orificed between chambers between the piston and the shock tube inner wall.

4. The apparatus of claim 1 that further includes sealing means for preventing fluid from escaping from said chambers.

5. The apparatus of claim 2 that further includes a first stop means mounted upon the shock tube for contacting one end of said spring and a second stop means on said piston rod for contacting the opposite end of said spring.

6. The apparatus of claim 5 that further includes annular rings mounted between said stop means and the ends of the spring.

7. Apparatus for isolating vibrations and absorbing shock loads acting upon a mass that includes:

a hydraulic damper that includes a cylinder having a movable piston rod extending from one end thereof, connecting means mounted upon the extended end of the piston rod and the other end of the cylinder for coupling a mass to a support structure a compression spring means for providing a preload on said piston rod so that the spring is further compressed as it moves into or out of said cylinder, each connecting means further including a core for surrounding a connector attached to the mass or a support structure, said core being centered upon the axis of said cylinder having flat top and bottom walls that are perpendicular to said axis and arcuate opposed side walls that join the top and bottom walls, a body section surrounding each core having an opening that complements the shape of said core to provide a space therebetween, an elastomeric vibration isolator mounted in the space between the arcuate side walls of the core and the complementary side walls of the body section and an air gap in the space between the flat top and bottom walls of the core and the complementary flat walls of said body section.

8. The apparatus of claim 7 wherein said elastomer compresses linearly or non-linearly under loads up to the spring preload whereupon opposed flat surfaces on the core and the body section are placed in face-to-face contact and the isolator spring rate increases rapidly.

* * * * *